United States Patent
Noh et al.

(10) Patent No.: US 11,995,880 B2
(45) Date of Patent: May 28, 2024

(54) METHOD AND DEVICE FOR DETECTING OUT-OF-DISTRIBUTION USING NOISE FILTER

(71) Applicant: Research & Business Foundation SUNGKYUNKWAN UNIVERSITY, Suwon-si (KR)

(72) Inventors: Soon Cheol Noh, Suwon-si (KR); Mann Soo Hong, Suwon-si (KR); Jee-Hyong Lee, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 343 days.

(21) Appl. No.: 17/561,125

(22) Filed: Dec. 23, 2021

(65) Prior Publication Data

US 2022/0230414 A1 Jul. 21, 2022

(30) Foreign Application Priority Data

Jan. 15, 2021 (KR) .......................... 10-2021-0005872

(51) Int. Cl.
| | |
|---|---|
| *G06V 10/764* | (2022.01) |
| *G06N 3/08* | (2023.01) |
| *G06T 5/70* | (2024.01) |
| *G06V 10/82* | (2022.01) |

(52) U.S. Cl.
CPC ............. *G06V 10/764* (2022.01); *G06N 3/08* (2013.01); *G06T 5/70* (2024.01); *G06V 10/82* (2022.01); *G06T 2207/20024* (2013.01)

(58) Field of Classification Search
CPC . G06T 2207/20081; G06T 2207/20084; G06T 7/75; G06T 7/00; G06V 10/82; G06V 10/764; G06V 10/30; G06V 10/70; G06V 40/1365; G06V 40/1388; G06V 20/698
See application file for complete search history.

(56) References Cited

U.S. PATENT DOCUMENTS

| | | | |
|---|---|---|---|
| 2020/0327674 A1* | 10/2020 | Yang | ........................ G06T 7/60 |
| 2021/0303798 A1* | 9/2021 | Duong | ................... H04L 51/02 |
| 2022/0008157 A1* | 1/2022 | Maier-Hein | ......... A61B 5/1495 |

OTHER PUBLICATIONS

Abdelzad et al., Detecting Out-of-Distribution Inputs in Deep Neural Networks Using an Early-Layer Output, arXiv:1910.10307v1 [cs.LG] Oct. 23, 2019, pp. 1-15.*
Yang et al., Generalized Out-of-Distribution Detection: A Survey, arXiv:2110.11334v3 [cs.CV], Jan. 23, 2024, pp. 1-32.*

(Continued)

*Primary Examiner* — Guillermo M Rivera-Martinez
(74) *Attorney, Agent, or Firm* — NSIP Law

(57) ABSTRACT

An Out-Of-Distribution (OOD) detection method performed by an OOD detection device is provided. The OOD detection method includes generating a noise filter using training data based on a target distribution and using a classification model pre-trained according to the target distribution, training the generated noise filter to reduce a loss function for a first output value obtained by applying the training data passed through the generated noise filter to the pre-trained classification model, and detecting Out-Of-Distribution (OOD) for new data using a second output value obtained by applying the new data passed through the trained noise filter to the pre-trained classification model.

20 Claims, 9 Drawing Sheets

(56) References Cited

OTHER PUBLICATIONS

Bulusu et al., Anomalous Example Detection in Deep Learning: A Survey, 10.1109/ACCESS.2020.3010274, Jul. 29, 2020.*

Henriksson et al., Performance analysis of out-of-distribution detection on trained neural networks, Information and Software Technology 130 (2021) 106409, 2021, pp. 1-12.*

Liang et al., Enhancing The Reliability of Out-of-distribution Image Detection in Neural Networks, ICLR 2018, arXiv:1706.02690v5 [cs.LG] Aug. 30, 2020, pp. 1-15, furnished via IDS.*

Liang, Shiyu et al., "Enhancing the Reliability of Out-Of-Distribution Image Detection In Neural Networks," arXiv:1706.02690v5, [cs.LG], Aug. 30, 2020, (15 Pages in English).

"Overview Of Anomaly Detection: [2] Introduction to Out-Of-Distribution (OOD) Detection Problems and Review Of Key Papers," Hoya 012's Research Blog, Feb. 20, 2020, (18 Pages in English, 18 Pages in Korean).

Korean Office Action Issued on Dec. 17, 2022, in counterpart Korean Patent Application No. 10-2021-0005872 (5 Pages in Korean).

* cited by examiner

| OOD DATASET | AUROC | | |
|---|---|---|---|
| | BASELINE | ODIN | PRESENT EMBODIMENT |
| LSUN-RESIZE | 95.4 | 99.2 | 97.6 |
| iSUN | 94.8 | 98.8 | 96.4 |
| TINYIMAGENET-CROP | 95.3 | 99.1 | 96.8 |
| TINYIMAGENET-RESIZE | 94.1 | 98.5 | 96.2 |

| DATA SIZE | ODIN | PRESENT EMBODIMENT |
|---|---|---|
| 10,000 | 10.7 min | 3.9 min (-72.9%) |

METHOD AND DEVICE FOR DETECTING OUT-OF-DISTRIBUTION USING NOISE FILTER

CROSS-REFERENCE TO RELATED APPLICATION

This application claims priority to Korean Patent Application No. 10-2021-0005872, filed on Jan. 15, 2021. The entire contents of the application on which the priority is based are incorporated herein by reference.

TECHNICAL FIELD

The present disclosure relates to a method and a device for detecting out-of-distribution using a noise filter.

BACKGROUND

Deep learning-based image classification is one of the research fields actively studied today. However, a general image classification model assumes that an image belongs to a target distribution, thereby only outputting the image's closest class.

Out-of-distribution detection, which detects abnormal samples lying outside a target distribution, is important in deep learning-based image classification. Out-of-distribution detection in image classification is a method that allows a model to determine whether or not an image to be classified belongs to the target distribution. Various methods are available for out-of-distribution detection, including a method involving learning with a task of out-of-distribution detection during the learning phase and a method involving analysis of parameters calculated when an image is applied to the model.

As described above, the out-of-distribution detection task in the image classification model determines input data that do not belong to the target distribution as Out-Of-Distribution (OOD) when the model receives the OOD data. In this regard, the task uses the Softmax score output from the classification model to distinguish data belonging to the target distribution from OOD data. Typical methods that explicitly reveal the difference include a method applying input processing to the image and a method employing OOD data from the training phase of the model.

Typical methods employing input processing include the Out-of-Distribution Image Detection in Neural Networks (ODIN). The ODIN method applies input processing that utilizes the Fast Gradient Signed Method (FGSM), one of the adversarial attack methods, in the reverse order to images and thereby increases the Softmax score when the image belongs to the target distribution. However, since the above-described method calculates and applies the input processing according to input images, the method's operating speed is slow. Moreover, since the method relies on the FGSM, a large amount of computation is required.

Conventional models use a technique that increases the Softmax score using the FGSM for OOD detection or requires additional learning. The FGSM requires a large amount of computation because it requires additional backward and forward processes.

Since the process of calculating parameters of the image classification model requires a large amount of computation and a lot of time, the image classification model needs to be deployed in advance for actual use; therefore, the process is not suitable for a mobile environment which requires prompt results. Also, the method of training a model using OOD detection as a task requires additional data, which inevitably requires a high cost.

The conventional OOD detection method uses a technique to increase the performance of OOD detection by generating for and applying noise to each image data. The method operates as follows. The conventional OOD detection method calculates the gradient of model weights when an input image passes through the model and generates noise that matches the input image based on the calculated gradient. The conventional OOD detection method generates a new image by applying the generated noise to the input image, passes the generated image through the model, and detects OOD data using the Softmax score.

Since the conventional method generates noise for each image data as described above, the noise once generated for specific image data may not be used for other data. For this reason, there is a problem that the conventional method takes a long time to detect OOD data and requires a large amount of computation. Since this feature of the conventional method is not suitable for a mobile device environment in which a model is deployed in advance for actual use, a method for improving the speed of OOD detection is needed.

SUMMARY

The embodiments of the present disclosure provide a method and a device for OOD detection that use a noise filter. The method and device are provided to improve OOD detection speed and reduce the amount of computation by generating a filter from a data classification model (for example, an image classification model), which may be applied commonly to OOD detection based on a target distribution.

Technical objects to be achieved by the present disclosure are not limited to those described above, and other technical objects not mentioned above may also be clearly understood from the descriptions given below by those skilled in the art to which the present disclosure belongs.

In accordance with an aspect of the present disclosure, there is provided an Out-Of-Distribution (OOD) detection method performed by an OOD detection device, the OOD detection method including: generating a noise filter using training data based on a target distribution and using a classification model pre-trained according to the target distribution; training the generated noise filter to reduce a loss function for a first output value obtained by applying the training data passed through the generated noise filter to the pre-trained classification model; and detecting Out-Of-Distribution (OOD) for new data using a second output value obtained by applying the new data passed through the trained noise filter to the pre-trained classification model.

Further, the training data may correspond to training image data based on a target image distribution, and the pre-trained classification model may correspond to an image classification model pre-trained according to the target image distribution.

Further, the generating the noise filter may include fixing parameters of the pre-trained classification model and setting an initial value of the noise filter to 0.

Further, the training the generated noise filter may include applying a temperature scaling to the first output value obtained by passing the training data to the pre-trained classification model.

Further, in the training the generated noise filter, the temperature scaling that divides the first output value by a temperature value, which is a hyperparameter, may be applied.

Further, the training the generated noise filter may include generating new training data by applying the generated noise filter to the training data and passing the newly generated training data to the pre-trained classification model.

Further, the training the generated noise filter may include training the generated noise filter to decrease a loss function defined to match the first output value to a true class.

Further, the loss function may be defined as a cross-entropy loss function.

Further, the detecting OOD for the new data may include applying the same temperature scaling applied to the first output value to the second output value obtained by passing the new data to the pre-trained classification model.

Further, the detecting OOD for the new data may include determining the new data as OOD data when the Softmax score of the second output value is less than or equal to a predetermined value.

In accordance with another aspect of the present disclosure, there is provided an Out-Of-Distribution (OOD) detection device including: a memory storing one or more programs; and a processor executing the stored one or more programs. Further, the processor is configured to: generate a noise filter using training data based on a target distribution and using a classification model pre-trained according to the target distribution; train the generated noise filter to reduce a loss function for a first output value obtained by applying the training data passed through the generated noise filter to the pre-trained classification model; and detect Out-Of-Distribution (OOD) for new data using a second output value obtained by applying the new data passed through the trained noise filter to the pre-trained classification model.

Further, the training data may correspond to training image data based on a target image distribution, and the pre-trained classification model may correspond to an image classification model pre-trained according to the target image distribution.

Further, the processor may be further configured to fix parameters of the pre-trained classification model and set an initial value of the noise filter to 0.

Further, the processor may be further configured to apply a temperature scaling to the first output value obtained by passing the training data to the pre-trained classification model, and the temperature scaling divides the first output value by a temperature value, which is a hyperparameter.

Further, the processor may be further configured to generate new training data by applying the generated noise filter to the training data and pass the newly generated training data to the pre-trained classification model.

Further, the processor may be further configured to train the generated noise filter to decrease a loss function defined to match the first output value to a true class.

Further, the loss function may be defined as a cross-entropy loss function.

Further, the processor may be further configured to apply the same temperature scaling applied to the first output value to the second output value obtained by passing the new data to the pre-trained classification model.

Further, the processor may be further configured to determine the new data as OOD data when the Softmax score of the second output value is less than or equal to a predetermined value.

In accordance with still another aspect of the present disclosure, there is provided a non-transitory computer-readable storage medium storing computer-executable instructions which cause, when executed by a processor, the processor to perform a method including: generating a noise filter using training data based on a target distribution and using a classification model pre-trained according to the target distribution; training the generated noise filter to reduce a loss function for a first output value obtained by applying the training data passed through the generated noise filter to the pre-trained classification model; and detecting Out-Of-Distribution (OOD) for new data using a second output value obtained by applying the new data passed through the trained noise filter to the pre-trained classification model.

The disclosed technique may have the following effects. However, this does not mean that a specific embodiment should include all of the following effects or only the following effects, so it should not be understood that the scope of the disclosed technique is limited thereby.

The embodiments of the present disclosure reduce the amount of computation but increase the operation speed required to detect OOD data based on a data classification model (for example, an image classification model), thereby being useful in a mobile environment lacking computing power or real-time analysis.

DETAILED DESCRIPTION

Figure 1:
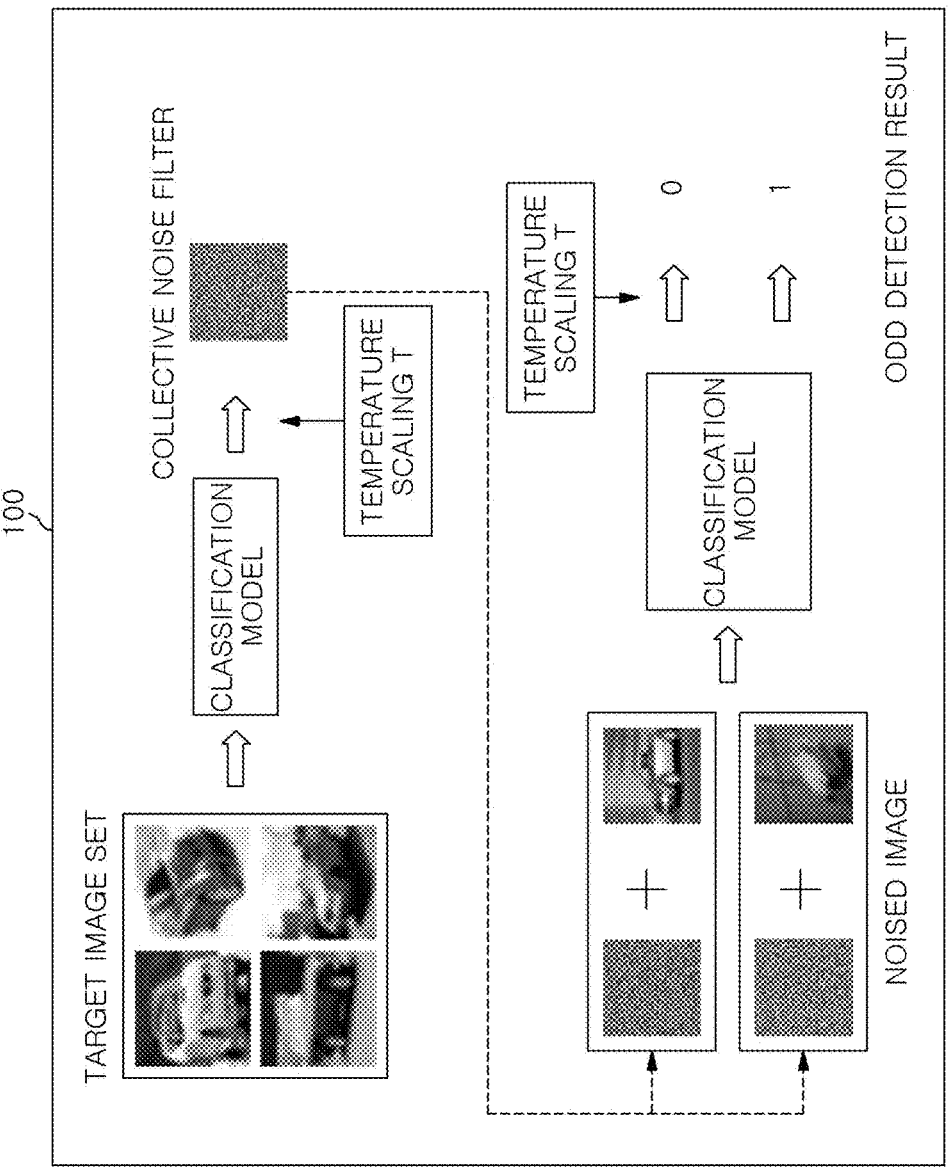
FIG. 1 illustrates operation of OOD detection device using a noise filter according to one embodiment of the present disclosure.

The present disclosure may be variously modified in various forms and may have various exemplary embodiments, and specific exemplary embodiments will be illustrated in the drawings and described in detail. However, it should be appreciated that the present disclosure is not limited to the specific exemplary embodiments and all modifications, equivalents and/or alternatives thereof also belong to the scope of the present disclosure. In the following description of exemplary embodiments of the present disclosure, the detailed descriptions of known functions or configurations incorporated herein will be omitted when it is determined that the detailed descriptions may unnecessarily obscure the subject matter of embodiments of the present disclosure.

Terms such as "first" and "second" may be used to describe various constituting elements, but the constituting elements should not be limited by the terms. The terms are introduced to distinguish one element from the others.

The terms used in the present application are only used for describing specific embodiments, and are not intended to limit the present disclosure. Unless otherwise defined, all terms used in the present specification, including technical or scientific terms, have the same meaning as commonly understood by one of ordinary skill in the art to which the present disclosure belongs. Terms such as those defined in commonly used dictionaries should be interpreted as having a meaning consistent with the meaning in a context of the related technology, and should not be interpreted as an ideal or excessively formal meaning unless explicitly defined in this application.

Singular expressions include plural expressions unless the context clearly indicates otherwise. In the present application, terms such as "comprise" or "have" are intended to designate the presence of features, numbers, steps, operations, components, parts, or combinations thereof described in the specification, but it should be understood that they do not preclude in advance the possibility of the presence or addition of one or more other features, numbers, steps, operations, components, parts, or combinations thereof.

Hereinafter, preferred embodiments of the present disclosure will be described in more detail with reference to the accompanying drawings. In describing the present disclosure, the same reference numerals will be given to the same components in the drawings, and redundant descriptions thereof will be omitted.

FIG. 1 illustrates an operation of an (DOD detection device using a noise filter according to one embodiment of the present disclosure.

To determine whether an image to be classified by an image classification model belongs to a target distribution or the image is OOD data that are not belonging to the target distribution is very important from a practical point of view of the classification model. In this regard, the Softmax score output from an artificial neural network model is checked; when its value is less than or equal to a predetermined value, the corresponding case is determined as OOD. Therefore, for OOD detection, the Softmax score should be set to a high value when an image classified by the classification model belongs to the target distribution while, when the image corresponds to OOD, the Softmax score should be set to a low value. As the difference is made to be more explicit, the performance of OOD detection becomes higher.

To this purpose, the CCD detection device 100 according to one embodiment of the present disclosure generates a general-purpose noise filter that helps the OOD detection by adding noise to an image before classification model classifies the image. The OOD detection device 100 generates a new image by applying a noise filter to an input image by setting the parameters of the classification model to fixed values. The OOD detection device 100 updates the noise filter by training the noise filter using the newly generated image as training data.

The OOD detection device 100 may speed up the task of OOD detection quickly by applying the noise filter generated in advance as described above to a new image to be tested for OOD and further increasing the difference of Softmax scores between the case when the new image belongs to a target distribution and the OOD case.

FIG. 1 illustrates the generation of a noise filter commonly applied to OOD detection and a framework for utilizing the noise filter according to one embodiment of the present disclosure. FIG. 1 shows that a noise filter for detecting one or more OOD data, which is generated with a target dataset, may be generally applied to different data other than the dataset.

As described above, in one embodiment of the present disclosure, a general-purpose noise filter for OOD detection may be generated from a given target distribution without involving additional training for a classification model, and the amount of computation and time required for OOD detection may be reduced by training the classification model using the Generated noise filter.

In one embodiment of the present disclosure, a noise filter for reducing a large amount of computation or time required for conventional input processing methods is generated, and a training operation is performed. In one embodiment of the present disclosure, different from the conventional methods that generate input processing noise suitable for an input image, a noise filter generally applied to a given target distribution for determining OOD data during a training phase is generated.

$$\text{output} = \text{Model}(\text{input image} + \text{Filter}) \quad \langle \text{Equation 1} \rangle$$

$$\text{Loss} = \text{Cross Entropy}(\text{output}, \text{true label})$$

In equation 1, input image indicates an input image, Filter indicates a noise filter, Model indicates a classification model, output indicates an output value of the classification model, true label indicates an actual class label of the input image, Cross Entropy ( ) indicates a cross-entropy function, and Loss indicates a loss function.

The OOD detection device 100 according to one embodiment of the present disclosure updates the value of the noise filter to decrease the loss function. Here, the loss function is defined to match the output obtained after the noised training data passes through the classification model to an actual class, as shown in equation 1.

Meanwhile, since the Softmax score is close to 1 in. the case of a model adequately trained for an image classification task, it is not easy to improve the performance further. Therefore, in one embodiment of the present disclosure, to decrease the overall Softmax score, the output z of the classification model is divided by the Temperature T, which is a hyperparameter specified by a user, as shown in Eq. 2.

$$\text{Softmax score} = \frac{\exp(z_i/T)}{\sum_j \exp(z_j/T)} \quad \langle \text{Equation 2} \rangle$$

The noise filter is generated according to a given classification model and a dataset based on a target distribution. The OOD detection device 100 may perform pre-processing that applies the generated noise filter to an input image in advance and compare an output value obtained by applying the classification model to the pre-processed data with a predetermined OOD value, thereby distinguishing the data belonging to the target distribution more clearly from OOD data.

Figure 2:
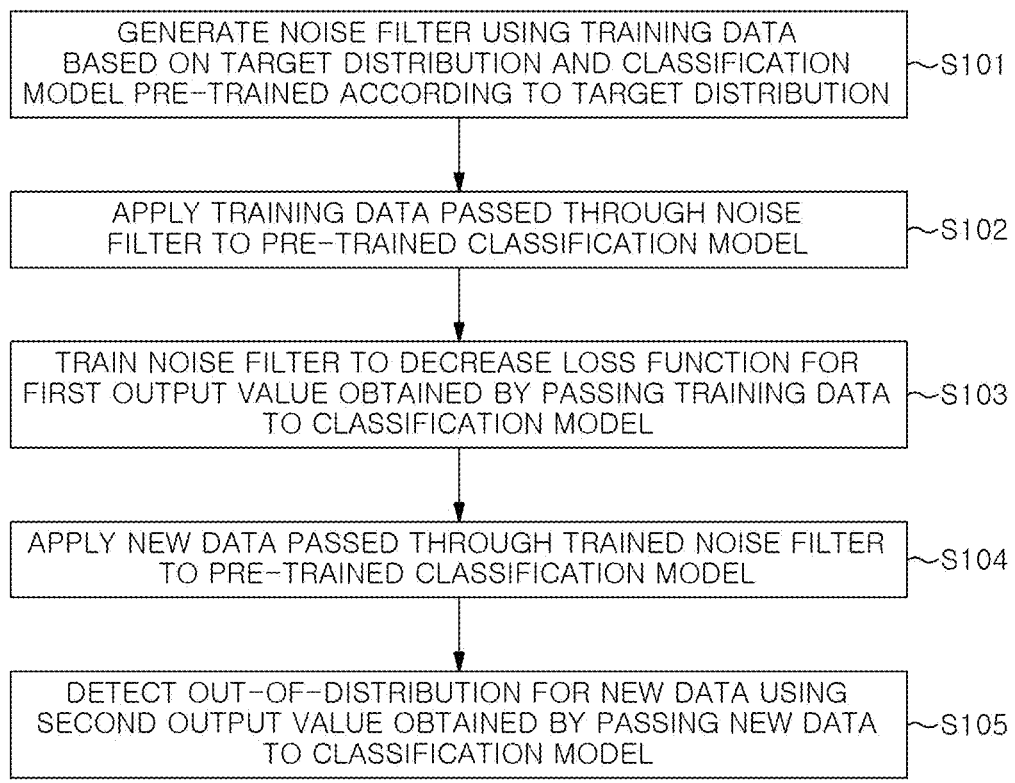
FIG. 2 is a flowchart illustrating an OOD detection method using the noise filter according to one embodiment of the present disclosure.

FIG. 2 is a flowchart illustrating an OOD detection method using the noise filter according to one embodiment of the present disclosure.

In step S101, the OOD detection device 100 generates a noise filter using training data based on a target distribution and a classification model pre-trained according to the target distribution. For example, the OOD detection device 100 may generate a noise filter that may be applied generally to the images belonging to the target distribution as a task of OOD detection. Here, the OOD detection device 100 may fix the parameters of the image classification model and set the initial value of the noise filter to 0.

In step S102, the OOD detection device 100 calculates a first output value by applying training data passed through the generated noise filter to the pre-trained classification model. For example, the OOD detection device 100 may perform temperature scaling on the first output value obtained by applying the classification model to a new image generated by adding noise to the images used for training the classification model.

In step S103, the OOD detection device 100 trains the generated noise filter to decrease a loss function for the first output value obtained from the classification model. The OOD detection device 100 may train the noise filter by constructing a cross-entropy loss function.

In step S104, the OOD detection device 100 calculates a second output value by applying new data passed through a trained noise filter to a pre-trained classification model. For example, the OOD detection device 100 may generate a new image by applying the generated noise filter (adding the generated noise) to an input image for classification. When the image for classification is applied to the classification model, the OOD detection device 100 may generate a new image by applying the noise filter generated in step S101 to the image for classification.

In step S105, the OOD detection device 100 determines whether new data correspond to Out-Of-Distribution (OOD) using the second output value from the classification model. The OOD detection device 100 detects OOD through the calculation of the Softmax score of the new image. The OOD device 100 may apply the same temperature scaling used for generating the noise filter to the second output value obtained by applying the new image to the classification model. And the OOD device 100 may detect OOD by calculating the Softmax score for the second output value to which the temperature scaling has been applied.

Figure 3:
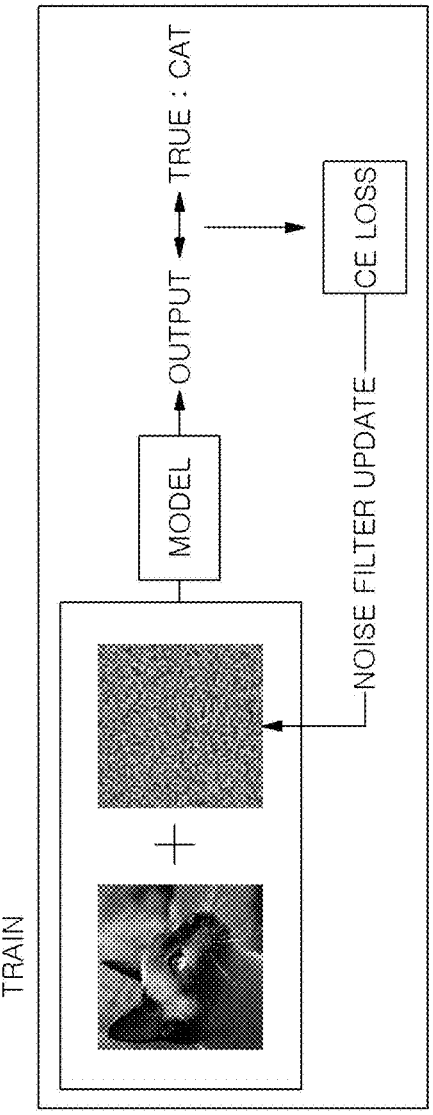
FIGS. 3 and 4 illustrate a noise filter training operation used for one embodiment of the present disclosure and a repetitive operation for the training operation.
Figure 4:
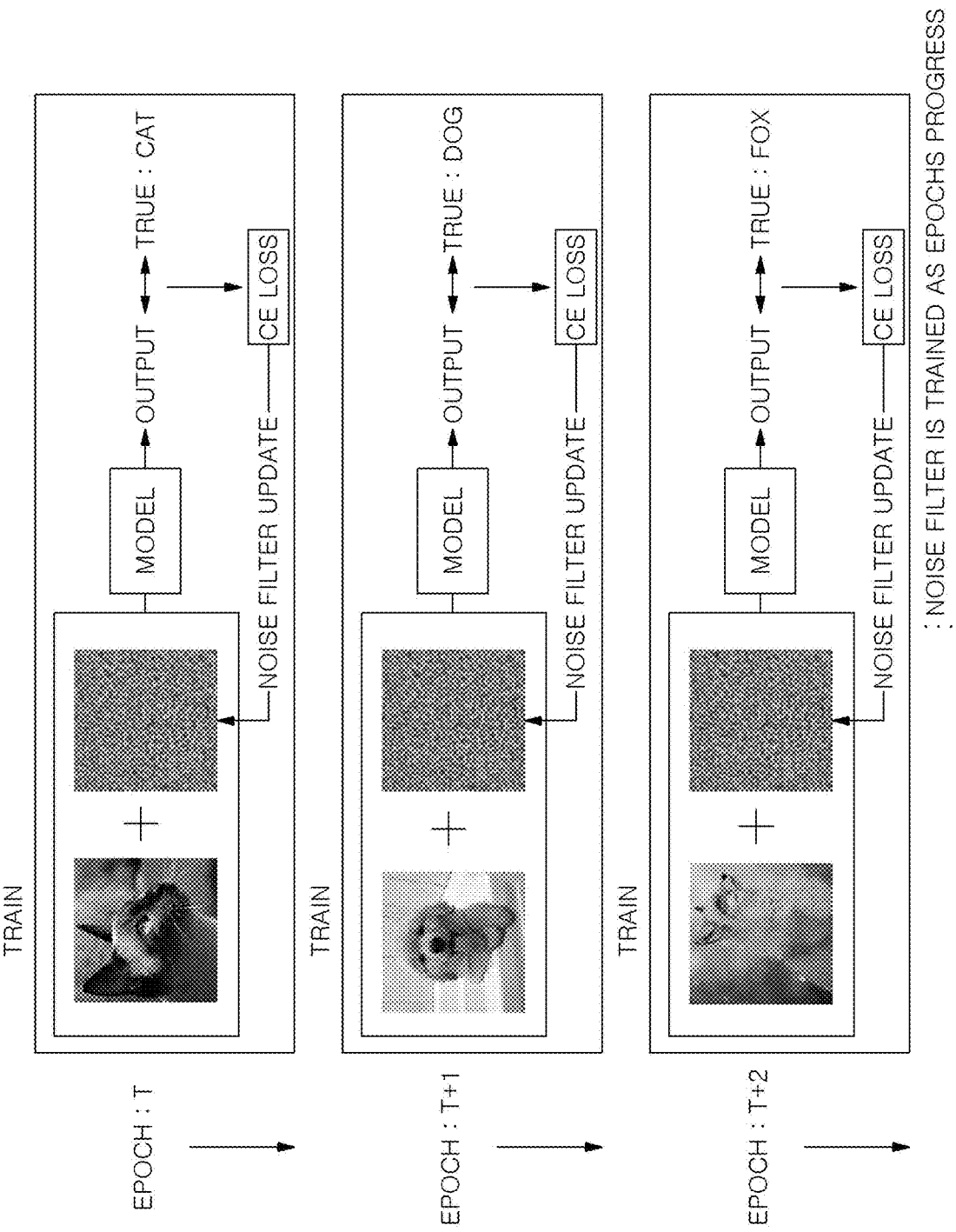

FIGS. 3 and 4 illustrate a noise filter training operation used for one embodiment of the present disclosure and a repetitive operation for the training operation.

First, it is assumed that a classification model trained adequately according to a target distribution is available. The OOD detection device 100 trains a noise filter using a train dataset with the target distribution and a trained classification model. The OOD detection device 100 trains the noise filter so that the output value from the classification model corresponds to the true class label. In this case, the OOD detection device 100 may update the noise filter to decrease the Cross-Entropy (CE) loss function. Then, the OOD detection device 100 generates a noise filter that matches the target distribution and the given classification model.

As shown in FIG. 4, the noise filter training operation of FIG. 3 trains the noise filter as the epochs progress.

Figures 5, 6:
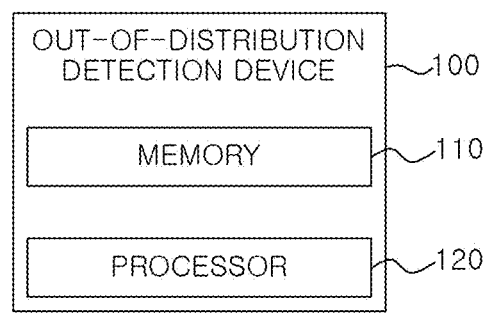
FIG. 5 illustrate a block diagram of the OOD detection device using the noise filter according to one embodiment of the present disclosure.
FIG. 6 shows a comparison result between an AUROC result according to one embodiment of the present disclosure and AUROC results according to conventional methods.
Figure 7:
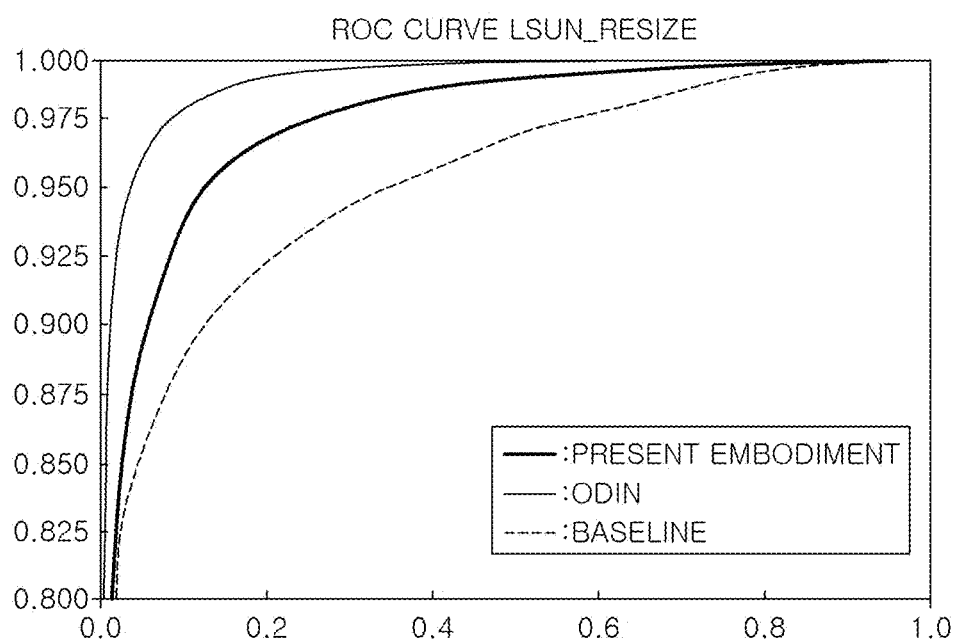
FIGS. 7 to 10 show comparison results between a ROC curve according to one embodiment of the present disclosure and ROC curves according to the conventional methods.
Figure 8:
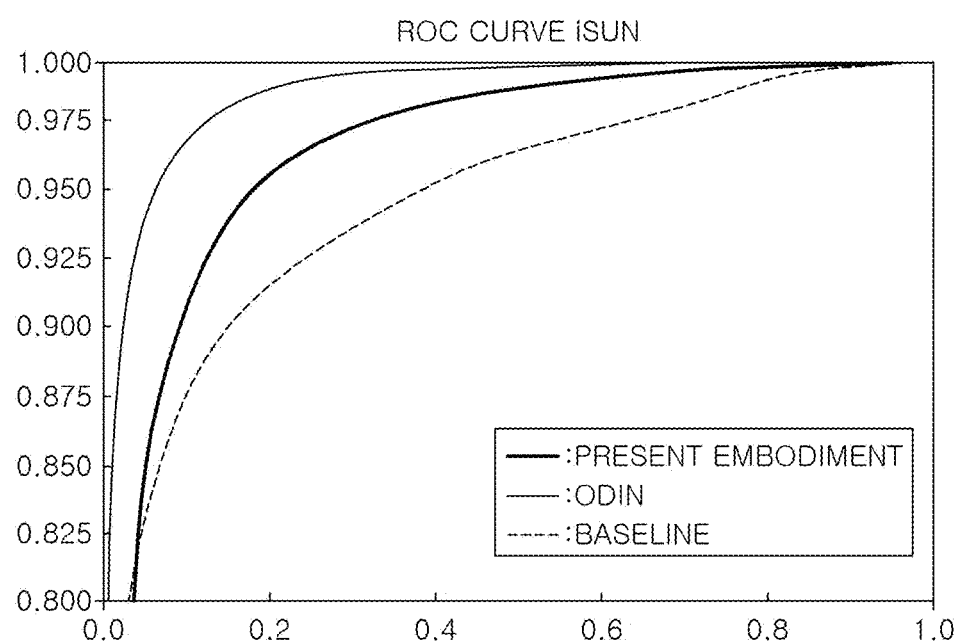
Figure 9:
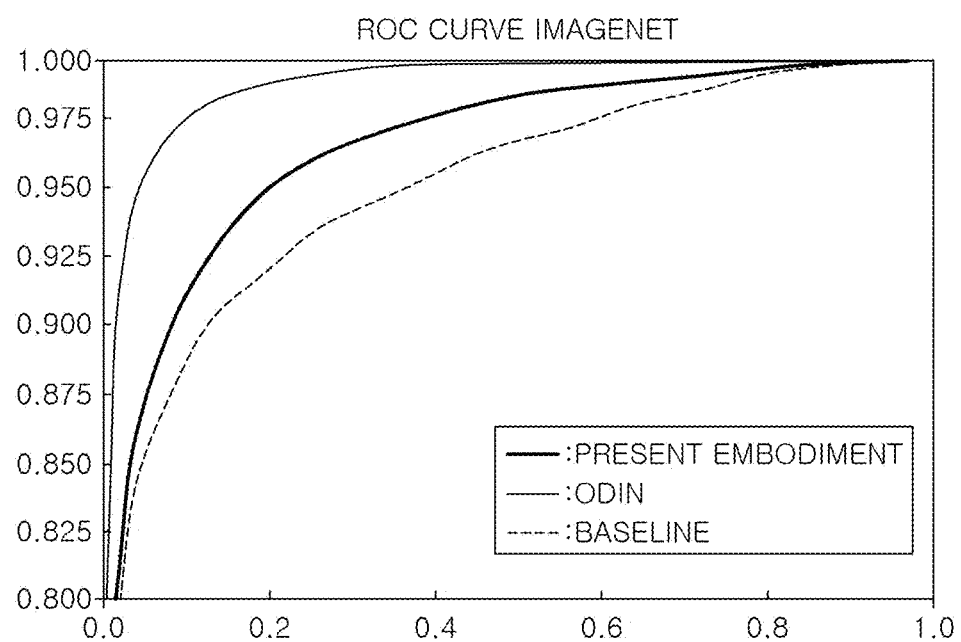

FIG. 5 illustrate a block diagram of the OOD detection device using the noise filter according to one embodiment of the present disclosure.

As shown in FIG. 5, the OOD detection device 100 using a noise filter according to one embodiment of the present disclosure includes a memory 110 and a processor 120. However, not all of the constituting elements shown in the figure are essential. More constituting elements than shown in the figure may be required to implement the OOD detection device 100, or fewer constituting elements than in the figure may implement the OOD detection device 100.

The OOD detection device 100 according to one embodiment of the present disclosure may detect OOD using a method that generates a noise filter matching a target distribution in advance and adds noise to an image input to an adequately pre-trained image classification model without involving additional training for the classification model.

In what follows, a specific structure and operation of each constituting element of the OOD detection device 100 using the noise filter of FIG. 5 will be described.

The memory 110 stores one or more programs.

The processor 120 executes one or more programs stored in the memory 110.

The processor 120 generates a noise filter using training data based on a target distribution and a classification model pre-trained according to the target distribution, trains the generated noise filter to decrease a loss function for a first output value obtained by applying training data passed through the generated noise filter to the pre-trained classification model, and detects OOD for new data using a second output value obtained by applying the new data passed through the trained noise filter to the pre-trained classification model.

According to the embodiments of the present disclosure, the training data may comprise training image data based on a target image distribution, and the pre-trained classification model may be a pre-trained image classification model matching the target image distribution.

According to the embodiments of the present disclosure, the processor 120 may fix parameters of the pre-trained classification model and set the initial value of the noise filter to 0.

According to the embodiments of the present disclosure, the processor 120 may apply temperature scaling to the first output value obtained by passing the training data to the pre-trained classification model.

According to the embodiments of the present disclosure, the processor 120 may apply temperature scaling that divides the first output value by a temperature value T, which is a hyperparameter, to the first output value.

According to the embodiments of the present disclosure, the processor 120 may generate new training data by applying the generated noise filter to the training data and pass the newly generated training data to the pre-trained classification model.

According to the embodiments of the present disclosure, the processor 120 may train the generated noise filter to decrease a loss function defined to match its output value to a true class.

According to the embodiments of the present disclosure, the loss function may be defined by a cross-entropy loss function.

According to the embodiments of the present disclosure, the processor 120 may apply the same temperature scaling applied to the first output value to the second output value obtained by applying the new data to the pre-trained classification model.

According to the embodiments of the present disclosure, the processor 120 may determine the new data as OOD data when the Softmax score of the second output value is less than or equal to a predetermined value as OOD.

FIG. 6 shows a comparison result between an AUROC result according to one embodiment of the present disclosure and AUROC results according to conventional methods.

FIGS. 7 to 10 show comparison results between a ROC curve according to one embodiment of the present disclosure and ROC curves according to the conventional methods.

FIG. 6 shows a comparison result between AUROC results according to the baseline, the conventional method (ODIN), and the present embodiment.

FIGS. 7 to 10 show comparison results between ROC curves according to the baseline, the conventional method (ODIN), and the present embodiment.

First, experimental data and model will be described below. An experiment has been conducted using a dataset corresponding to a target distribution, the CIFAR-10 dataset labeled with multiple classes. CIFAR-10 comprises ten classes and is composed of 60,000 32×32 RGB image samples. The experiment used 50,000 samples as a training dataset and 10,000 samples as a test dataset.

As a model for classifying the CIFAR-10 dataset, the experiment used a pre-trained model, known as DenseNet-BC. The model yields an accuracy of 95.19% for the CIFAR-10 data classification task.

For OOD data, the experiment used a total of four datasets, including LSUN Resize, iSUN, Tiny ImageNet Crop, and Tiny ImageNet Resize datasets.

The experiment used a noise filter trained over 500 epochs using a learning rate of 0.001, a temperature value of 500, and a batch size of 128.

The experiment used the AUROC as a determining factor. AUROC is a value representing the area of the ROC curve constructed through TPR and FPR and is suitable for comparing OOD detection performance.

The tables shown in FIG. 6 and FIGS. 7 to 10 illustrate the comparison of AUROC measurement results and ROC curves for the respective OOD datasets.

Here, Baseline represents a result when no particular processing is applied to the DenseNet-BC.

ODIN represents a result when the conventional method, called ODIN, is applied to the DenseNet-BC.

The present embodiment represents a result when a general-purpose noise filter for OOD detection according to one embodiment of the present disclosure is applied to the DenseNet-BC.

Figures 10, 11:
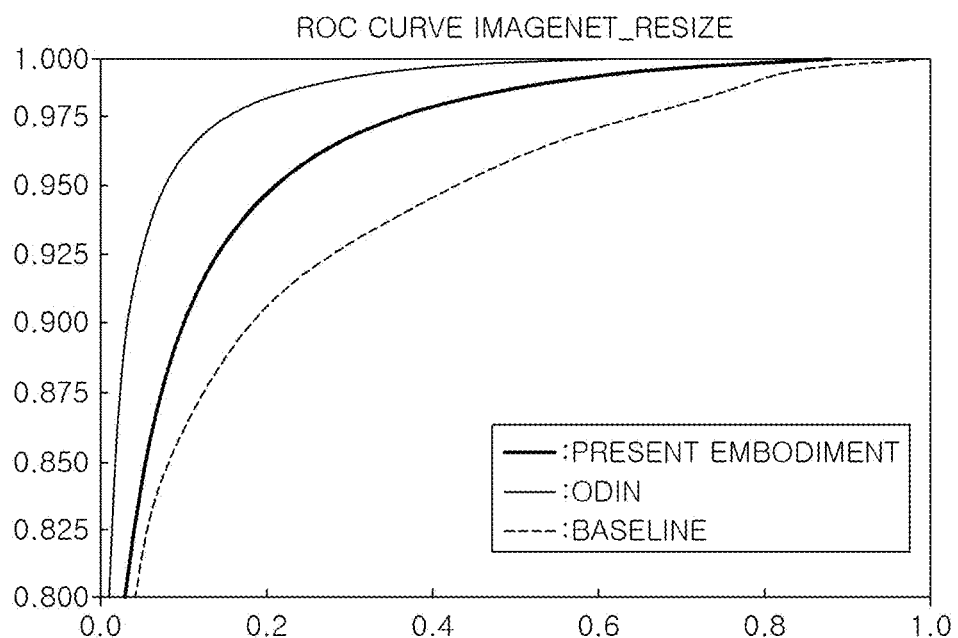
FIG. 11 shows a comparison result between the time required for OOD analysis according to one embodiment of the present disclosure and the time required for OOD analysis according to the conventional method.

FIG. 11 shows a comparison result between the time required for OOD analysis according to one embodiment of the present disclosure and the time required for OOD analysis according to the conventional method.

In the table shown in FIG. 11, the time required for analysis of OOD detection according to one embodiment of the present disclosure is compared with the time required for analysis of OOD detection according to the conventional method when the GeForce RTX 2080 Ti 12G GPU is employed.

It was found that the time required to determine OOD according to one embodiment of the present disclosure is reduced by 72.9% compared to that obtained from the conventional method (ODIN) when the GeForce RTX 2080 Ti 12G GPU is employed.

The conventional method (ODIN) may improve the performance since input processing is applied to generate noise for each data. However, the noise generated by the conventional method (ODIN) is not suitable for different data other than the data used for generating the noise. Moreover, the conventional method takes a long time to execute the input processing and requires a large amount of computation. According to one embodiment of the present disclosure, the time required for determining OOD and the amount of computation have been reduced significantly by using a pre-trained, general-purpose noise filter.

Meanwhile, there may be provided a non-transitory computer-readable storage medium storing computer-executable instructions which cause, when executed by a processor, the processor to perform a method including: generating a noise filter using training data based on a target distribution and using a classification model pre-trained according to the target distribution; training the generated noise filter to reduce a loss function for a first output value obtained by applying the training data passed through the generated noise filter to the pre-trained classification model; and detecting Out-Of-Distribution (OOD) for new data using a second output value obtained by applying the new data passed through the trained noise filter to the pre-trained classification model.

According to the embodiments of the present disclosure, the various embodiments described above may be implemented as software including instructions stored in a machine-readable storage media. The machine (e.g., a computer) may be a device capable of calling a stored instruction from a storage medium and operating according to the called instruction, and may include an electronic device according to the disclosed embodiments. When the instruction is executed by the processor, the processor may perform a function corresponding to the instruction directly or by using other components under the control of the processor. The instruction may include a code generated or executed by a compiler or an interpreter. The machine-readable storage media may be provided in a form of a non-transitory storage medium. Herein, the 'non-transitory' indicates that the storage medium does not include a signal and is tangible, but does not distinguish that the data is stored in the storage medium semi-permanently or temporarily.

In addition, according to the embodiments of the present disclosure, a method according to various embodiments described above may be provided by being included in a computer program product. The computer program product may be traded between a seller and a buyer as a commodity. The computer program product may be distributed in a form of the machine-readable storage media (e.g., compact disc read only memory (CD-ROM)) or through an application store (e.g., Play Store™) by online. In the case of online distribution, at least part of the computer program product may be temporarily stored or temporarily generated in a storage medium such as a server of a manufacturer, a server of an application store, or a memory of a relay server.

Further, according to the embodiments of the present disclosure, the various embodiments described above may be implemented in a medium that may be read by a computer or a similar device by using software, hardware, or a combination thereof. In some cases, the embodiments described in this application may be implemented by the processor itself. According to software implementation, embodiments such as procedures and functions described in this application may be implemented by separate software modules. Each of the software modules may perform one or more functions and operations described in this application.

Meanwhile, computer instructions for performing a processing operation of a device according to the various embodiments described above may be stored in a non-transitory computer-readable medium. When the computer instructions stored in the non-transitory computer-readable medium are executed by the processor of the specific device, the computer instructions cause the specific device to perform processing operations according to the various embodiments described above. The non-transitory computer-readable medium refers to a medium that stores data semi-permanently rather than a medium such as registers, caches, and memory that stores data for a short moment, and may be read by a device. Specific examples of the non-transitory computer-readable media may include CD, DVD, hard disk, Blu-ray disk, USB, memory card, ROM, and the like.

In addition, each of the components (e.g., a module or a program) according to the various embodiments described above may include a singular or plural entity, and a part of the above-described sub-components may be omitted, or another sub-component may be further included in the various embodiments. Alternatively or additionally, a part of components (e.g., the module or the program) may be integrated into a single entity, thereby identically or similarly performing functions performed by each of the components before the integration. The operations performed by the module, the program, or another component according to various embodiments may be executed sequentially, parallel, repetitively, or heuristically, at least a part of operations may be executed in a different order or omitted, or another operation may be added.

While certain embodiments have been described, these embodiments have been presented by way of example only and are not intended to limit the scope of the disclosures. Indeed, the embodiments described herein may be embodied in a variety of other forms. Furthermore, various omissions, substitutions and changes in the form of the embodiments described herein may be made departing from the spirit of the disclosures. The accompanying claims and their equivalents are intended to cover such forms or modifications as would fall within the scope and spirit of the disclosures.

What is claimed is:

1. An Out-Of-Distribution (OOD) detection method performed by an OOD detection device, the OOD detection method comprising:
    generating a noise filter using training data based on a target distribution and using a classification model pre-trained according to the target distribution;
    training the generated noise filter to reduce a loss function for a first output value obtained by applying the training data passed through the generated noise filter to the pre-trained classification model; and
    detecting Out-Of-Distribution (OOD) for new data using a second output value obtained by applying the new data passed through the trained noise filter to the pre-trained classification model, wherein the new data includes an image to be classified by the pre-trained classification model and the detecting OOD for the new data comprises determining whether the image to be classified by the pre-trained classification model belongs to the target distribution or the image is OOD data not belonging to the target distribution.

2. The OOD detection method of claim 1, wherein the training data correspond to training image data based on a target image distribution, and the pre-trained classification model corresponds to an image classification model pre-trained according to the target image distribution.

3. The OOD detection method of claim 1, wherein the generating the noise filter includes fixing parameters of the pre-trained classification model and setting an initial value of the noise filter to 0.

4. The OOD detection method of claim 1, wherein the training the generated noise filter includes applying a temperature scaling to the first output value obtained by passing the training data to the pre-trained classification model.

5. The OOD detection method of claim 4, wherein, in the training the generated noise filter, the temperature scaling that divides the first output value by a temperature value, which is a hyperparameter, is applied.

6. The OOD detection method of claim 1, wherein the training the generated noise filter includes generating new training data by applying the generated noise filter to the training data and passing the newly generated training data to the pre-trained classification model.

7. The OOD detection method of claim 1, wherein the training the generated noise filter includes training the generated noise filter to decrease a loss function defined to match the first output value to a true class.

8. The OOD detection method of claim 1, wherein the loss function is defined as a cross-entropy loss function.

9. The OOD detection method of claim 4, wherein the detecting OOD for the new data includes applying the same temperature scaling applied to the first output value to the second output value obtained by passing the new data to the pre-trained classification model.

10. The OOD detection method of claim 1, wherein the detecting OOD for the new data includes determining the new data as OOD data when a Softmax score of the second output value is less than or equal to a predetermined value.

11. An Out-Of-Distribution (OOD) detection device, comprising:
    a memory storing one or more programs; and
    a processor executing the stored one or more programs, wherein the processor is configured to:
        generate a noise filter using training data based on a target distribution and using a classification model pre-trained according to the target distribution;
        train the generated noise filter to reduce a loss function for a first output value obtained by applying the training data passed through the generated noise filter to the pre-trained classification model; and
        detect Out-Of-Distribution (OOD) for new data using a second output value obtained by applying the new data passed through the trained noise filter to the pre-trained classification model, wherein the new data includes an image to be classified by the pre-trained classification model and the detecting OOD for the new data comprises determining whether the image to be classified by the pre-trained classification model belongs to the target distribution or the image is OOD data not belonging to the target distribution.

12. The OOD detection device of claim 11, wherein the training data correspond to training image data based on a target image distribution, and the pre-trained classification model corresponds to an image classification model pre-trained according to the target image distribution.

13. The OOD detection device of claim 11, wherein the processor is further configured to fix parameters of the pre-trained classification model and set an initial value of the noise filter to 0.

14. The OOD detection device of claim 11, wherein the processor is further configured to apply a temperature scaling to the first output value obtained by passing the training data to the pre-trained classification model, and the temperature scaling divides the first output value by a temperature value, which is a hyperparameter.

15. The OOD detection device of claim 11, wherein the processor is further configured to generate new training data by applying the generated noise filter to the training data and pass the newly generated training data to the pre-trained classification model.

16. The OOD detection device of claim 11, wherein the processor is further configured to train the generated noise filter to decrease a loss function defined to match the first output value to a true class.

17. The OOD detection device of claim 11, wherein the loss function is defined as a cross-entropy loss function.

18. The OOD detection device of claim 14, wherein the processor is further configured to apply the same temperature scaling applied to the first output value to the second output value obtained by passing the new data to the pre-trained classification model.

19. The OOD detection device of claim 11, wherein the processor is further configured to determine the new data as OOD data when a Softmax score of the second output value is less than or equal to a predetermined value.

20. A non-transitory computer-readable storage medium storing computer-executable instructions which cause, when executed by a processor, the processor to perform a method comprising:
- generating a noise filter using training data based on a target distribution and using a classification model pre-trained according to the target distribution;
- training the generated noise filter to reduce a loss function for a first output value obtained by applying the training data passed through the generated noise filter to the pre-trained classification model; and
- detecting Out-Of-Distribution (OOD) for new data using a second output value obtained by applying the new data passed through the trained noise filter to the pre-trained classification model, wherein the new data includes an image to be classified by the pre-trained classification model and the detecting OOD for the new data comprises determining whether the image to be classified by the pre-trained classification model belongs to the target distribution or the image is OOD data not belonging to the target distribution.

* * * * *